(12) United States Patent
Inam (10) Patent No.: US 12,230,965 B2
(45) Date of Patent: Feb. 18, 2025

(54) POWER FLOW CONTROL SYSTEM FOR A DISTRIBUTION GRID HAVING A GRID FORMING CAPABILITY

(71) Applicant: Smart Wires Inc., Union City, CA (US)

(72) Inventor: Haroon Inam, San Jose, CA (US)

(73) Assignee: Smart Wires, Inc., Durham, NC (US)

( * ) Notice: Subject to any disclaimer, the term of this patent is extended or adjusted under 35 U.S.C. 154(b) by 215 days.

(21) Appl. No.: 17/856,598

(22) Filed: Jul. 1, 2022

(65) Prior Publication Data

US 2023/0216301 A1    Jul. 6, 2023

Related U.S. Application Data

(60) Provisional application No. 63/266,195, filed on Dec. 30, 2021.

(51) Int. Cl.
*H02J 3/18* (2006.01)
*H02J 3/32* (2006.01)
*H02J 3/38* (2006.01)
*H02M 1/42* (2007.01)

(52) U.S. Cl.
CPC ............... *H02J 3/1842* (2013.01); *H02J 3/32* (2013.01); *H02J 3/381* (2013.01); *H02M 1/4233* (2013.01); *H02J 2300/22* (2020.01); *H02J 2300/28* (2020.01)

(58) Field of Classification Search
CPC .. H02J 3/1842; H02J 3/32; H02J 3/381; H02J 2300/22; H02J 2300/28; H02M 1/4233

USPC .......................................................... 323/205
See application file for complete search history.

(56) References Cited

U.S. PATENT DOCUMENTS

| | | |
|---|---|---|
| 9,853,445 B2 | 12/2017 | Hosny et al. |
| 9,866,012 B2 | 1/2018 | Hosny et al. |
| 10,396,594 B2 | 8/2019 | Fallis et al. |
| 2005/0012395 A1 | 1/2005 | Eckroad et al. |
| 2007/0103824 A1 | 5/2007 | Patterson et al. |
| 2010/0087959 A1 | 4/2010 | Williams, Jr. |
| 2012/0068540 A1 | 3/2012 | Luo et al. |
| 2012/0240643 A1 | 9/2012 | Kleineberg |
| 2013/0238151 A1 | 9/2013 | Vaum et al. |
| 2014/0084695 A1* | 3/2014 | Fornage ............. H02J 3/16 307/82 |

(Continued)

*Primary Examiner* — Yemane Mehari
(74) *Attorney, Agent, or Firm* — Womble Bond Dickinson (US) LLP (57) ABSTRACT

A system for managing power delivery and power flow in a distribution grid having grid forming capability is disclosed. The system includes a connect-disconnect switches operable to connect a power transmission grid to and disconnect the power transmission grid from the distribution grid. The distribution grid includes renewable energy generators and a number of loads. The system further includes a full bridge shunt inverter system connected to the distribution grid. The full bridge shunt inverter system includes a four-quadrant DC-to-AC inverter and at least a battery for power storage and operable as a power source for grid formation. The system further includes a pair of active filters connected in series on the distribution grid. The full bridge shunt inverter system is connected to the distribution grid at a node between the active filters to enable impedance adjustment for managing and controlling the power flow in the distribution grid.

20 Claims, 9 Drawing Sheets

(56) References Cited

U.S. PATENT DOCUMENTS

| | | |
|---|---|---|
| 2016/0241032 A1 | 8/2016 | Zimmanck et al. |
| 2016/0329713 A1* | 11/2016 | Berard .................. H02J 3/32 |
| 2017/0250540 A1* | 8/2017 | Varma .................. H02J 3/46 |
| 2017/0271973 A1* | 9/2017 | Jones .................. H02M 7/537 |
| 2020/0028362 A1* | 1/2020 | Rowe .................. H02J 3/16 |
| 2021/0006072 A1* | 1/2021 | Vestesen .................. H02J 3/42 |
| 2021/0249862 A1 | 8/2021 | Awal et al. |

\* cited by examiner

POWER FLOW CONTROL SYSTEM FOR A DISTRIBUTION GRID HAVING A GRID FORMING CAPABILITY

CROSS-REFERENCE TO RELATED APPLICATIONS

This application claims the benefit of U.S. Provisional Application No. 63/266,195 filed on Dec. 30, 2021, the disclosure of which is incorporated herein by reference.

TECHNICAL FIELD

The present disclosure relates to control of power flow and power delivery, using series connected impedance injection modules, and shunt connected inverter system in a distribution grid with capability for grid forming and providing a source for synchronous and reactive power to loads as required. The control capability provides a system utility the flexibility to optimize operation of the distribution grid.

BACKGROUND

Figure 1:
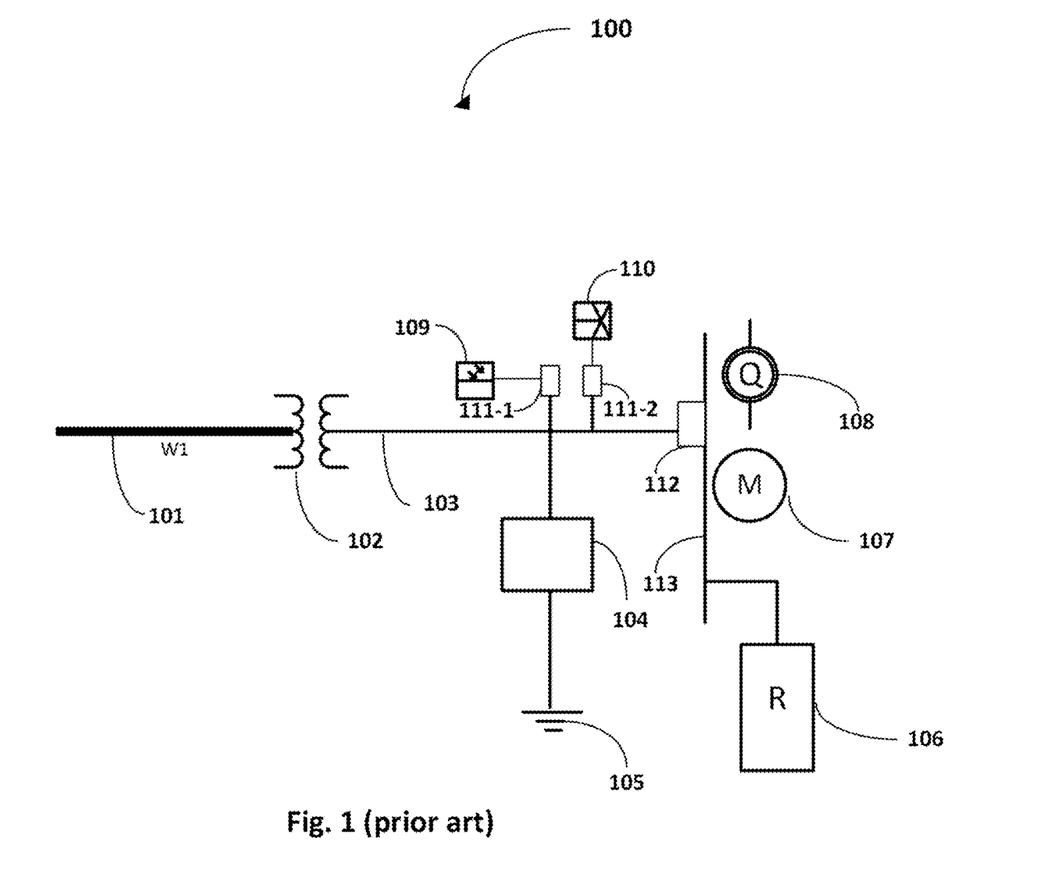
FIG. 1 is a diagram illustrating a conventional simplified distribution grid coupled to a transmission/supply grid as an example of a distribution grid system having multiple loads and renewable resources attached to the distribution grid.

FIG. 1 is a diagram illustrating a conventional distribution grid system 100 of today where distribution grid 103 is a medium or low voltage grid that comprises distributed renewable power generators 109 (e.g., a wind generator) and 110 (e.g., a solar generator) and loads 106 (e.g., a resistive load R), 107 (e.g., an inductive load M), and 108 (e.g., a reactive load Q), respectively. These distributed power generators 109, 110 are coupled to the distribution grid 103 through FACTS controllers 111-1 and 111-2. The loads 106, 107, 108 are distributed within the distribution grid 103, currently shown for clarity as connected to a load bus 113 coupled to the power distribution grid 103 during normal operation. The load bus 113 is shown connected to the distribution grid 103 using a demand-response FACTS controller 112. Power is transferred from the power transmission grid 101 to the distribution grid 103 through the step-down transformer 102. Power to the loads 106, 107, 108 is provided by the power supplied by the power transmission grid 101 and the distributed renewable generators 109 and 110 during normal operation. The electromagnetic interference (EMI) filter circuit 104 helps reduce high frequency oscillations on the distribution grid system 100. As indicated in FIG. 1, the distributed renewable power generators 109, 110 and the load bus 113 are all coupled to the distribution grid 103 using FACTS based control units 111-1,111-2 and 112 respectively, having the needed operational control capability for normal operation of the distribution grid system 100. These FACTS based controllers 111-1, 111-2 and 112 provide a high level of controllability to handle power flow over the distribution grid 103 during normal operation. But these controllers are not suitable for catering to reactive power requirements of the distribution grid 103 when the load characteristics change as loads 106, 107, 108 are added or removed, or when fault conditions happen, such as when the inductive loading of the lines increases beyond the capability of the distribution grid system to provide reactive power or when sudden surge requirements happen due to short circuit conditions. These incidents can result in currents of the order of 3-10× normal magnitude. Typical grid systems need 3 to 10× the normal current or more to activate circuit protections during short circuits. The FACTS control devices 111-1, 2 are not well suited to supply such large currents suddenly. Incidents, when the necessary reactive components required by the loads or the required short circuit currents to enable circuit protections are not provided, can result in unacceptable voltage collapses or high current drain from the distribution grid, which can lead to total system failure.

In addition to the above, by having the distributed renewable power generator 109 and power generator 110 that provide power to the system in an intermittent fashion, a power sharing issue for the distribution grid is created. When power is generated by the distributed renewable generators, it is shared between the connected loads 106 (e.g., a resistive load R), 107 (e.g., an inductive load M), and 108 (e.g., a reactive load Q), the grid forming circuit to charge the battery and the transmission grid 101 resulting in non-optimum use of the power generation from natural resources. Similarly, when there is low natural resource based power generation the transmission grid 101 provides all the power to the load and for charging the grid forming battery.

Therefore, there is a need in the art for a solution which overcomes the drawbacks described above and enable optimization of the capabilities built into a distribution grid, such as the distribution grid 103.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Embodiments of the disclosure provide a way to control and optimize the power utilization in a distribution grid with a power flow control system having grid forming capability. The power flow control system may control the power flow from the natural resource based generation to the loads and for charging the grid forming battery which may be enhanced to store any excess energy generated without sharing it back to the power grid via a transmission grid and when the natural resource based power generated is low, use the excess power stored for the load before taking power from the power grid, thereby optimizing the operation of the distributed generators and storage available on the distribution grid.

With the advent of distributed local generation from natural green resources such as wind farming, e.g., using wind generator 110, biogas and solar energy, e.g., solar generator 109, that are not predictable, and are typically connected to the medium or low voltage distribution grid 103 as shown in FIG. 1, the control of stability of the grid as a whole and especially the distribution grid has become an important consideration. The recent advances in non-conventional generation, such as wind, solar, geothermal, tidal and wave energy systems, that respond to unpredictable weather and environment-related characteristics and are dispersed across geographical locations, including within the distribution grid 103, coupled with the cyclic and unpredictable nature of consumer demand for power, has made the optimization of power flow over the grid from generation to distribution based on previously established traditional models more difficult and more challenging.

Further, the use of flexible alternating current transmission system (FACTS) based control units in the grid and in connection of the non-conventional generation sources to the distribution grid and loads to the distribution grid 103 coupled with respective current-source inverters, has resulted in the reduced capacity to supply transient reactive power from the generation sources to the distribution grid 103, when requirements arise. This was previously handled by traditional rotating power sources over the power grid which are now being augmented by the new renewable generation capability. The FACTS controllers coupling the distributed generation capability and loads to a distribution grid (e.g., distribution grid 103 of FIG. 1) are extremely efficient in controlling the operation of the distribution grid system under normal operating conditions. However, when sudden load shifts or short circuit issues occur, the FACTS based devices are unable to provide the needed surge currents and transient reactive power needed to keep the system stable. Hence, there is a need for establishing a grid forming capability for the distribution grids 103 that is able to prevent the system from becoming unstable due to voltage instabilities or collapsing under these specific conditions. Furthermore, there is a need for the distribution grid, with high penetration of renewable energy sources, coupled with respective FACTS based current-source inverters, to provide sufficient surge current in the event of a short circuit, to activate the protection circuitry in a short time. This is needed to prevent damage to the load devices, e.g., loads 106, 107, 108 of FIG. 1, and to the components of the distribution grid system. It also prevents power outages or blackouts.

According to some embodiments, a capability is introduced using two active filters connected on either side of a full bridge shunt inverter system comprising a 4-quadrant DC-to-AC inverter and a battery power source connection to a distribution grid for enabling a grid forming capability. The active filter units typically using FACTS based full bridge impedance injection units provide full control of power flow within the distribution grid that is coupled via a connect disconnect switch to the transmission grid, the distribution grid having distributed natural resource based power generation and loads coupled to it. By adjusting the impedance of the dual active filters the system is able to control where the power is drawn from and for what us, allowing optimization of the power flow in the distribution grid.

According to one aspect, a system for controlling power flow in a distribution grid having grid forming capability is provided. The system includes a connect-disconnect switch operable to connect a power transmission grid to and disconnect the power transmission grid from the distribution grid. The distribution grid includes renewable energy generators and a number of loads. The system further includes a full bridge shunt inverter system connected to the distribution grid. The full bridge shunt inverter system includes a four-quadrant DC-to-AC inverter and at least a battery for power storage and operable as a power source for grid formation. The system further includes a pair of active filters connected in series on the distribution grid. The full bridge shunt inverter system is connected to the distribution grid at a node between the active filters to enable impedance adjustment for power flow control of the distribution grid.

According to another aspect, a method of controlling power flow between a power transmission grid and a distribution grid having grid forming capability is provided, with the distribution grid being connected in series with a pair of active filters. The method includes in a first filter state, operating the active filters to exert no control on power flow conditions of the distribution grid. The method further includes in a second filter state, operating the active filters to reduce power flow from the power transmission grid to the distribution grid, or from the distribution grid to the power transmission grid. The method further includes in a third filter state, operating the active filters to enable at least one battery of a full bridge shunt inverter system to charge using power drawn from the power transmission grid, and to provide power drawn from renewable energy generators of the distribution grid to a number of loads of the distribution grid. The method further includes in a fourth filter state, operating the active filters to isolate the full bridge shunt inverter system from the power transmission grid, and to provide the power drawn from the renewable energy generators to the loads.

Other aspects and embodiments will become apparent from the following detailed description taken in conjunction with the accompanying drawings which illustrate, by way of examples, the principles of the described embodiments.

Figure 2:
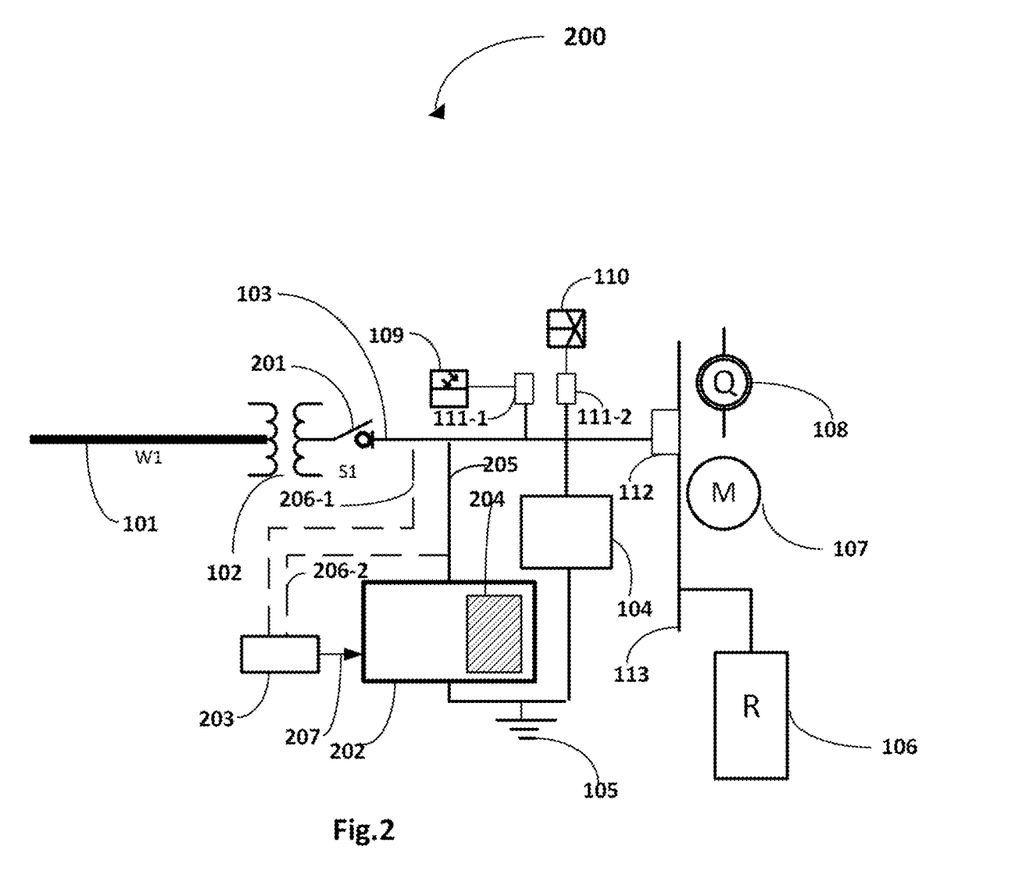
FIG. 2 is a schematic diagram of a grid forming capability with parallel connected full bridge inverter system comprising at least a four-quadrant inverter, a battery/power source and a disconnect switch that enable the distribution grid to be disconnected from the transmission/supply grid when needed according to an embodiment.

FIG. 2 is a schematic diagram of a distribution grid system with a capability for grid forming according to an embodiment. In FIG. 2, distribution grid system 200 includes a connect-disconnect switch 201. The connect-disconnect switch may be a typical switch combination of a vacuum interrupter combined with a recloser switch that is used in power grid applications. Herein, the connect-disconnect switch 201 is configured to connect and disconnect a distribution grid 103 to and from a first segment of the grid 103. The first segment of grid 103 can be a supply or power transmission grid 101 connected and forming a segment of the power transmission grid 101 (also designated as part of power transmission grid 101), during an identified problem, such as a sudden incidence of reactive load 108 coming on line in the distribution grid 103 creating a voltage instability in the grid system that, if not corrected, can lead to a power system failure. Alternately, if a short circuit in the power grid 101 or the distribution grid 103 happens, it can create disturbances and/or oscillations that can lead to trip conditions and shut down of distribution grid system 200. In an embodiment, a second segment of distribution grid 103 may include the coupled renewable energy generation resources, for example power generators 109-110 (e.g., wind and solar generators), and loads, for example load 106 (e.g., resistive load R), load 107 (e.g., inductive load M) and load 108 (e.g., reactive load Q), that draw power for operation. In the case of a short circuit in the power transmission grid 101, the connect-disconnect switch 201 can be used to isolate and protect the loads 106-108 and the distributed generation capability coupled to the distribution grid 103. In the case of a sudden demand for reactive power or a short circuit in the distribution grid 103, the connect-disconnect switch 201 can be used to prevent voltage and system instability arising out of the specific condition at the distribution grid from impacting the operation of the transmission grid 101 and the distribution grid system 200 as a whole until corrective action is initiated and completed. Though FIG. 2 shows power transmission grid 101 and distribution grid 103 each as a segment, it is not to be considered limiting. Other grid feeders/power transmission grids 101, and other load busses, for example further distribution grids 103, may all be connected to the distribution grid system 200 directly or via a number of recloser/connect-disconnect switches, for example connect-disconnect switches 201.

With continued reference to FIG. 2, a FACTS based full-bridge shunt inverter system 202, which may include a four-quadrant inverter (not shown), for example four-quadrant DC-to-AC inverter, that is configured to operate as 1) a current source/active filter and/or (2) a voltage source with high-current capability (described in more detail herein below). In current source mode, the inverter may act like a static volt-amps reactive (VAR) compensator (SVC) or augmented high-current active filter. In voltage mode, the inverter can provide very high currents and VARs demanded by a load (e.g., at least one of loads 106-108) and as a result of controlling the system voltage. In an embodiment, the four-quadrant inverter may include a number of switching components (e.g., four sets of switching components), which can be for example insulated gate bipolar transistors (IGBTs) or other high power electronic switch devices, such as thyristors that have similar functional switching characteristics, configured as or forming the four-quadrant inverter. In an embodiment, the switching components may individually be controllable by associated switch control capability (or switch controllers) that are controlled by instructions from a control module or controller 203 enabled to control the full bridge shunt inverter system 202. In an embodiment, controller 203 may operate the connect-disconnect switch 201 based on line conditions (e.g., voltages and currents) sensed on distribution grid 103. As further shown in FIG. 2, full bridge shunt inverter system 202 may include a storage battery/power source 204 (e.g., rechargeable storage battery/power source) coupled to the four-quadrant inverter having sufficient storage/power delivery capacity and sufficiently low source impedance, to supply surge current requirements and reactive current requirements that arise at the load (e.g., at least one of loads 106-108). In an embodiment, storage battery/power source 204 can have a volt-ampere rating sufficient to keep the distribution grid 103 alive for a period greater than the typical supply fail durations and provide a power source for grid formation in case of a failure.

Figure 3A:
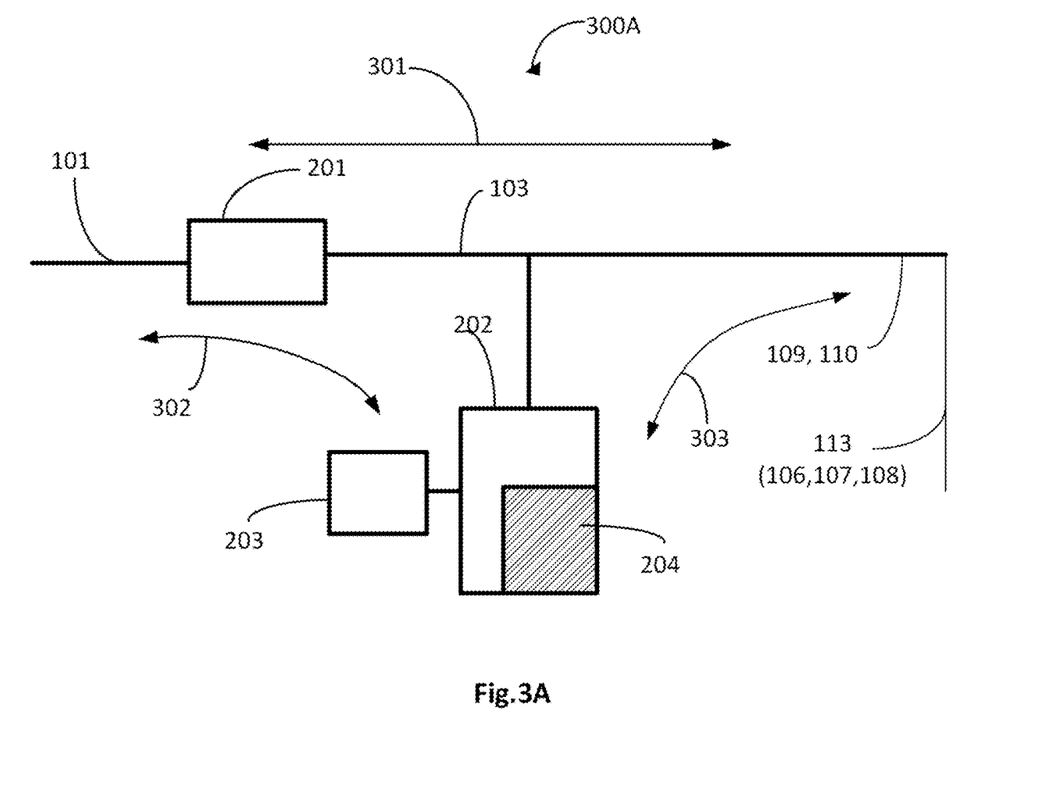
FIGS. 3A-3B are block diagrams showing operation of the full bridge inverter system with the four-quadrant inverter coupled to the battery/power source in normal operation configuration with the disconnect switch shorted and in grid forming configuration with the disconnect switch enabled according to an embodiment.
Figure 3B:
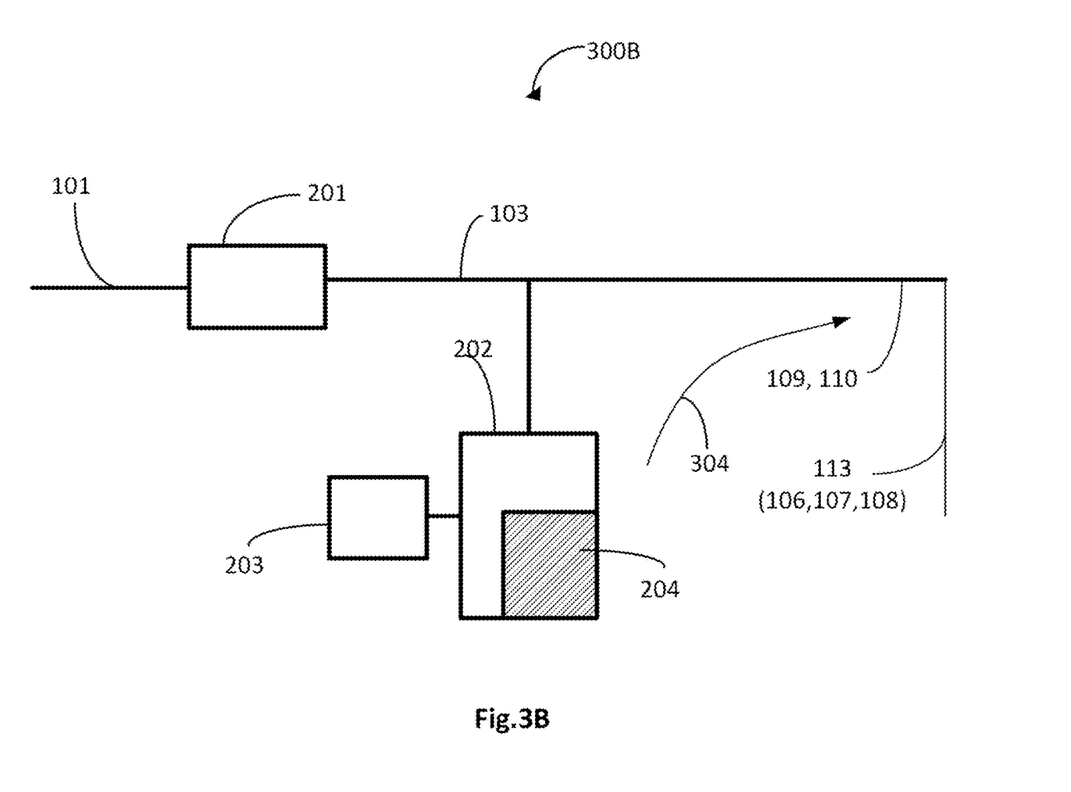

FIGS. 3A-3B are block diagrams showing operation of a full bridge shunt inverter system having grid forming capability in normal operation configuration with a connect-disconnect switch shorted, and in grid forming configuration with the connect-disconnect switch disconnecting a transmission grid from the distribution grid according to an embodiment. In some embodiments, the full bridge shunt inverter system is the full bridge inverter system 202 of FIG. 2.

Referring to FIGS. 3A and 3B, the operation shows power flow within a distribution grid system (which may also be distribution grid system 200 of FIG. 2) in two possible conditions of connect-disconnect switch 201. With respect to the first condition (case 1), referring to distribution grid system 300A of FIG. 3A, the connect-disconnect switch 201 connects the power transmission grid 101 to the distribution grid 103. With respect to the second condition (case 2), referring to distribution grid system 300B of FIG. 3B, the connect-disconnect switch 201 is open to disconnect the power transmission grid 101 from the distribution grid 103.

In one embodiment, the controller 203 continuously monitors the distribution grid 103, in the first condition (case 1), outputting a power correction impedance, and in the second condition (case 2), providing reactive power support and grid forming capability. This includes providing short circuit surge current for protection circuits to be activated and short-term sustaining capability to the working distribution grid.

In the first case (case 1), as depicted in FIG. 3A, the four-quadrant inverter (not shown) and the battery/power source 204 of the full bridge shunt inverter system 202 may be used to provide power factor correction for the loads 106, 107, 108 connected to the distribution grid 103 during normal operation. This enhances the power flow in the distribution system. The full bridge shunt inverter system 202 may also be used to source low total harmonic distortion (THD) current waveforms that enhance power flow to load from the power supply grid 101.

The storage battery of the battery/power source 204, when inactive, gets charged in normal operation from the power supplied both by the power transmission grid 101 and the power from the distributed natural resource-based generators, for example wind generator 110 and solar generator 109, coupled to the distribution grid 103 using FACTS controllers 111-1 and 111-2 (as illustrated in FIG. 2).

The operation of the full bridge shunt inverter system 202 with the four-quadrant inverter, in either case 1 or case 2 and in further scenarios, is controlled by controller 203 that can sense voltages and currents on the distribution grid 103 and connection 205 of full bridge shunt inverter system 202 to the distribution grid 103 via sense lines 206-1 and 206-2, respectively (as also illustrated in FIG. 2). In an embodiment, controller 203 determines the output waveform needed for either power factor correction during the normal operation or optimization of other requirements of the distribution grid 103, by providing control inputs to the four-quadrant inverter.

In the second case (case 2), as depicted in FIG. 3B, the connect-disconnect switch 201 may disconnect the distribution grid 103 from the power transmission grid 101. The controller 203 takes control to provide switching and current control instructions to the four-quadrant inverter in the full bridge shunt inverter system 202, thereby enabling grid forming and sustaining of the continued distribution grid 103 operation when necessary.

When additional reactive load is brought on the load bus 113 of the distribution grid 103, e.g., by additional reactive loads 108 and inductive loads 107, the reactive power demand is conveyed to the distribution grid 103 through a FACTS-based demand-response controller 112 coupling the load bus 113 to the distribution grid 103. The distribution grid 103 may not be able to support this additional demand for reactive power immediately in a conventional system (e.g., system 100 of FIG. 1). This can result in a drastic voltage drop at the load bus 113 which gets transferred to the distribution grid 103 and from there to even the transmission grid 101. This can cause the distribution grid system to become unstable quickly, further cascading the instability to the supply and high voltage grids resulting in total system failure. A similar result can happen if the distribution grid 103 has a short circuit condition. When this happens surge current requirement increases. Due to the inherent nature of the FACTS based controllers 111-1, 111-2 coupling the generators 109, 110 using natural resources which provide part of the power to the distribution grid 103, the availability of short circuit current is limited. This limitation can result in the available short circuit current being insufficient to trip any protection circuits of the short-circuited loads by disconnecting the shorted load from the load bus 113 or the load bus 113 from the distribution grid 103. The continued active short circuit can adversely impact the operation of the distribution grid 103, the transmission grid 101 and even the high voltage power grid, leading to instabilities and disruption of power system.

Under these conditions the controller 203 may sense the status of the distribution grid 103 via the sense lines 206-1 and 206-2 and the connect-disconnect switch 201 is used to disconnect the transmission grid 101 from the distribution grid 103 (as shown in FIGS. 2, 3A and 3B). The controller 203 may simultaneously bring online the full bridge shunt inverter system 202 comprising the four-quadrant inverter with the charged battery/power source 204. The switching of the FACTS devices of the four-quadrant inverter, for example the IGBTs or thyristor switch circuits, are controlled by switch controllers (FIG. 4, 501 A to D) using control inputs from the controller 203 based on the sensed distribution circuit voltage and current characteristics fed back to the controller 203 through sense lines 206-1 and 206-2. The controller 203 may enable switching circuits of the four-quadrant inverter to provide from the storage battery/power source 204 the necessary active, reactive, and distortion power needed to operate the active loads (e.g., loads 106-108 of FIG. 2). Power to these loads on the distribution grid 103 is provided until the fault is rectified and the supply from the transmission grid 101 can take up the load requirements again when the connect-disconnect switch 201 is closed. Such action can prevent voltage collapse in the distribution grid system, in case of higher-than-normal reactive or short circuit loading, thereby avoiding grid voltage anomalies and associated failure.

Similarly, the controller 203 is able to deliver, by adjusting the switching of the switching circuits 402 in the four-quadrant inverter 401 of the full bridge shunt inverter system 202, short circuit surge currents from the storage battery/power source 204 to activate the protection circuits for isolating the short circuited components and loads connected to the distribution grid 103 when the connect-disconnect circuit is isolating the distribution grid 103 from the transmission grid 101. The full bridge shunt inverter system 202 may also provide black-start capability to keep the distribution grid 103 and the unaffected loads on the load bus 113 restarted and operating until a resolution to the problem can be found and the connect-disconnect switch 201 reset for normal operation of the distribution grid 103.

Referring back to FIG. 3A, the power flow pattern within distribution grid system 300A is operating normally. The power from the power transmission grid 101 to the loads 106, 107 and 108 connected on the load bus 113 through the FACTS-based demand response controller 112 coupling to the distribution grid 103 is shown as power flow 301. The battery of the battery/power source 204 coupled to the four-quadrant inverter (again not shown) of the full bridge shunt inverter system 202 is charged from both the input from the power transmission grid 101 as shown in power flow arrow 302, and the green natural resource-based power generated, such as from wind generator 110 and solar generator 109, as shown in power flow 303. Charging of such a battery, and discharging of the battery (e.g., when the four-quadrant inverter of the full bridge shunt inverter system 202 is operated as a power source) is managed in various embodiments by the controller 203 operating the four-quadrant inverter of the full bridge shunt inverter system 202 in implementations specific to various types of batteries as readily devised. The green natural resource-based power generation sources, e.g., wind generator 110 and solar generator 109, are shown coupled to the distribution grid 103 via FACTS based controllers 111-1 and 111-2 (see FIG. 2). Power flow 303 also acts to provide the impedance input on to the distribution grid 103 to address power factor correction needs of the distribution grid 103 to improve power flow to the load bus 113.

Referring now to FIG. 3B, a power flow 304 flows from the battery/power generator source 204 to the load bus 113 to address the need for reactive power and for catering to short circuit current sufficient to activate the protection circuits when need arises when the connect-disconnect switch 201 is deactivated to disconnect the distribution grid 103 from the transmission grid 101. The power from the battery may also provide short-term sustaining power for loads on the load bus 113 connected to the distribution grid 103 when the short-circuited loads have been disconnected from circuit and prior to the reclosure switch activation to reconnect the power transmission grid 101 and the distribution grids 103 for normal operation.

Figure 4:
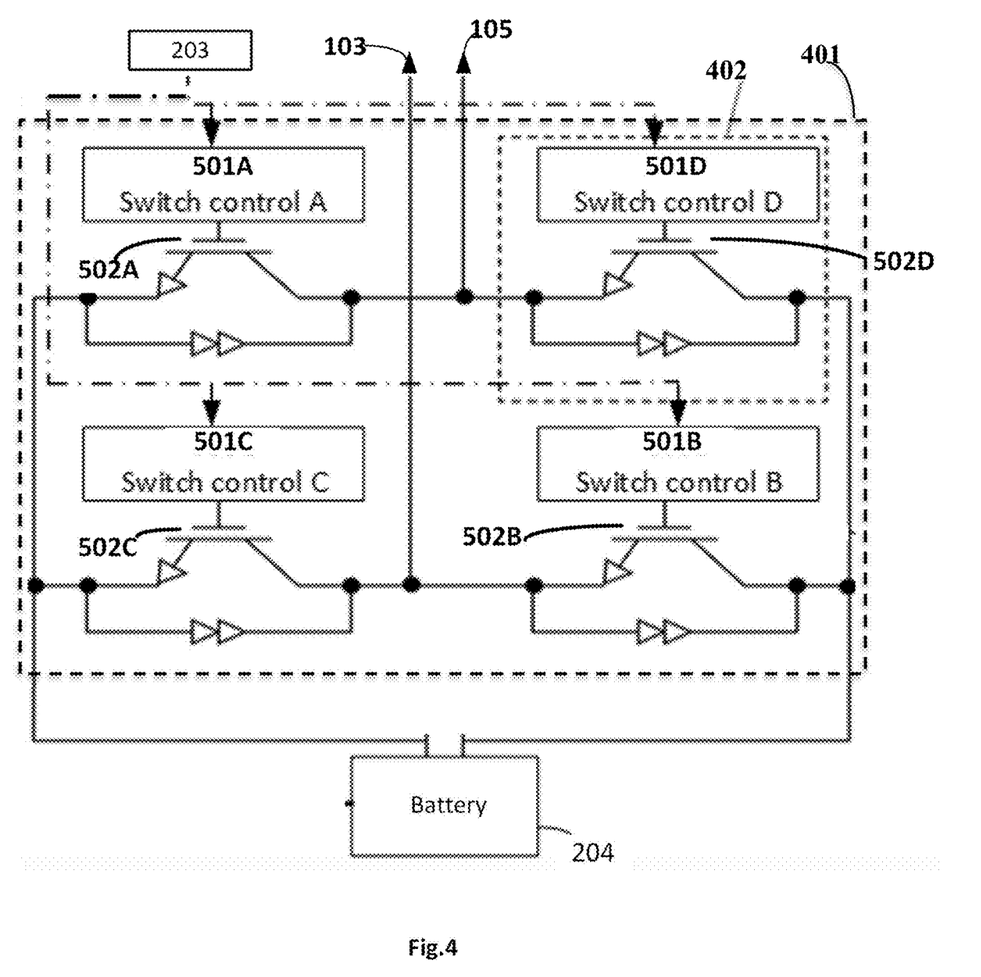
FIG. 4 is a schematic diagram of an example full bridge shunt inverter system having a four-quadrant inverter or circuit coupled to a battery/power source according to an embodiment.

FIG. 4 is a schematic diagram of an example full bridge shunt inverter system having a four-quadrant inverter or circuit coupled to a battery/power source. Though only one four-quadrant inverter 401 is shown, it is not meant to be limiting, and a number of four-quadrant inverters may be included in the full bridge shunt inverter system.

Referring to FIG. 4, the full bridge shunt inverter system (e.g., full bridge shunt inverter system 202 of FIG. 2) may be implemented with IGBT full bridge circuits 402 that, for example, can be connected in series-parallel connections to handle different voltages and currents demanded by different distribution grids. These IGBT full bridge circuits or switching units 402 may be used as impedance injection units (IIUs) to inject impedance into segments of transmission lines for power flow control. In some embodiments, the switching units are ideal for use with medium/low voltage full bridge shunt inverter system 202 to provide the necessary power factor control from the storage battery/power source 204 when the connect-disconnect switch 201 is opened. By using the available switching circuits, such as IIUs, a level of manufacturing efficiency can be achieved that will allow for cost reduction of the proposed grid forming capability.

As shown in FIG. 4, the full bridge switching circuits 402 can be implemented with the IIUs that form the four-quadrant inverter 401. The full bridge switching circuits 402 may include four IGBTs 502A-502D connected as a full bridge configuration with each IGBT connecting to a switching control (e.g., switch controls 501A-501D). The switch controls 501A-501D are controlled by the controller 203 associated with the full bridge shunt system 202 (as shown in FIG. 2). The bridge of the IGBTs 502A-502D, thyristors or other high voltage switches may be connected between the distribution grid 103 and ground 105. During normal operation the storage battery/power source 204 associated with the full bridge shunt inverter system 202 is charged up from the power supplied by the power transmission grid 101 and the distributed green natural resource-based power generators coupled to the distribution grid 103. When there is a need to provide for power factor correction, and/or alternate current waveforms, the controller 203 is able to generate desired current waveforms by adjusting the switch initiation and timing of the IGBTs 502A-502D, through switch controls 501A-501D, to inject the required waveform into the distribution grid 103. When the load requirements on the load bus 113 change and reactive power or short circuit current is demanded by the distribution grid 103 to supply the load, the connect-disconnect switch 201 is used to disconnect the power transmission grid 101 from the distribution grid 103 and the IGBTs 502A-502D are controllably switched under control of the controller 203 to supply the needed grid forming voltage, along with the desired peak short circuit current or reactive power to the load bus 113 from the storage battery/power source 204 of the full bridge shunt inverter system 202.

This grid forming capability also enables load portion of the distribution grid 103 to be restarted from black start to enable checking to prevent any further short circuits and prevent complete shutdown of the grid during a reclosure of the switch 201. The black start enables the distribution grid 103 to activate and enable any needed protection/load disconnection devices and take corrective action before a reclosure is initiated to bring the grid system back to normal operation.

Figure 5:
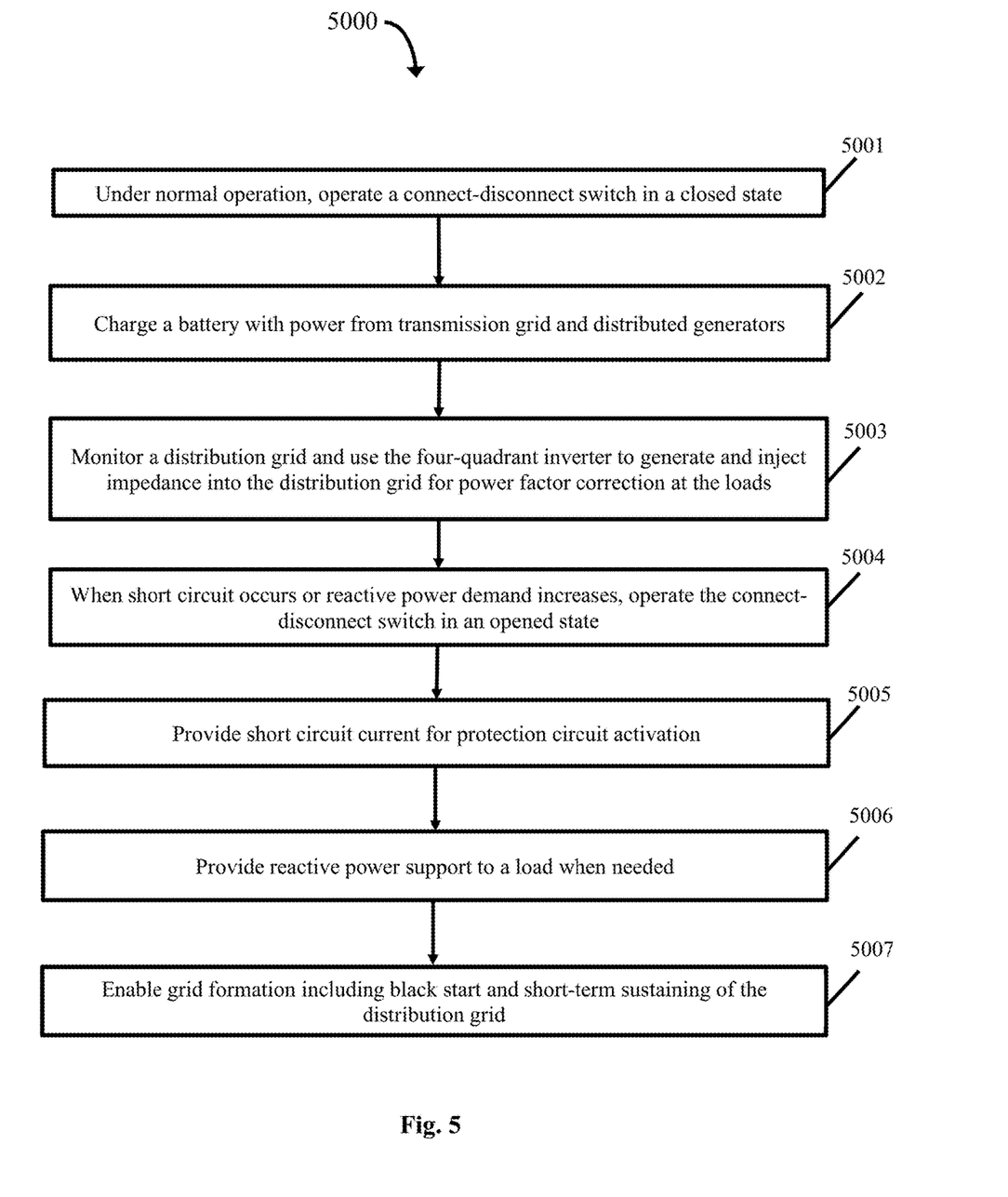
FIG. 5 is an example flow chart showing an embodiment of the application.

FIG. 5 shows a flow chart of an operation of an embodiment of the application. In some embodiments, operation 5000 may be performed by distribution grid system 200 of FIG. 2.

Referring to FIG. 5, at block 5001, under normal operating conditions the connect disconnect switch 201 may operate in a closed state connecting the transmission grid 101 to the distribution grid 103. In this condition the load draws power in a shared fashion from the transmission grid 101 and the distributed renewable power generators 109 and 110.

At block 5002, power source, for example a bank of batteries, coupled to the four-quadrant inverter 401 of the full bridge shunt inverter system 202 may be charged with the power from the transmission grid 101 and the distributed generators 109 and 110 coupled to the distribution grid 103.

At block 5003, controller 203 of full bridge shunt inverter system 202 monitors the power flow in the distribution grid 103 and uses the four-quadrant inverter 401 of the full bridge shunt inverter system 202 to generate the impedance to be injected into the distribution grid 103 to optimize the power flow by adjusting the power factor at the connected loads.

At block 5004, when a short circuit or a large reactive power/current demand occurs, the connect disconnect switch is operated in an opened state (e.g., disconnected) to isolate the distribution grid 103 from the transmission grid 101, thereby reducing the possibility of voltage instability, oscillations and other disturbances that otherwise could result in power system wide load disruption and power system shutdowns.

In various embodiments, the controller 203 provides inputs to the four-quadrant inverter 401 to:
1. at block 5005, provide the necessary short circuit current for protection circuit activation. For example, controller 203 may provide short circuit current to the protective circuitry of any shorted load to be activated,
2. at block 5006, provide any needed reactive power support to the load when needed, to reduce the impact of voltage instability,
3. at block 5007, enable grid formation including the ability for black or dark start, and to provide short-term sustaining capability for distribution grid 103 operation.

The following list shows the types of power conditions addressable by the full bridge shunt inverter system 202 enabled with grid forming capability described herein. In various embodiments, power conditions and capabilities include, but are not limited to, the following:
1. Generate impedance, inductive or capacitive as required and injected to correct for the power factor of the power supplied to the load under normal operating conditions.
2. The ability to make sure that the power supplied to the load is a sinusoid for optimum load functionality.
3. Provide sufficient short circuit and surge current to the distribution grid to activate any protection circuitry to isolate the problem loads.
4. Provide power supply to the connected loads for operation while any issues on the distribution grid are resolved.
5. Supply any sudden requirements of reactive power that can create voltage instability of the distribution grid, due to turn on of motor or other high reactive power demand loads.
6. Enable dark start capability to the distribution grid, once the recovery operation from grid failure is complete.

As discussed above, the full bridge shunt inverter system 202 enabled with grid forming capability disclosed for the distribution grid will enable the distribution grid to be more effective in providing the necessary capabilities to handle the connected loads and recover form short circuits and other voltage instability problems without damaging the overall power grid functionality.

In order to fully use the capabilities of the currently disclosed distribution grid 103 and optimize its operation, it is necessary to have the capability to control the power flow into and within the distribution grid 103. Such a control provides flexibility to the utility to control the power transfer from, to and within the distribution grid 130. The flexibility includes optimizing utilization of power from natural resource based generation, capability for excess power storage in a secondary battery, limiting power transfer from Transmission grid, Using the stored power when forming a grid for supply of power to a power distribution system, from a flexible alternating current transmission system (FACTS) based full bridge shunt inverter system comprising at least a 4-quadrant DC-to-AC inverter, a battery/power source and a controller, when a supply disruption happens.

Figure 6:
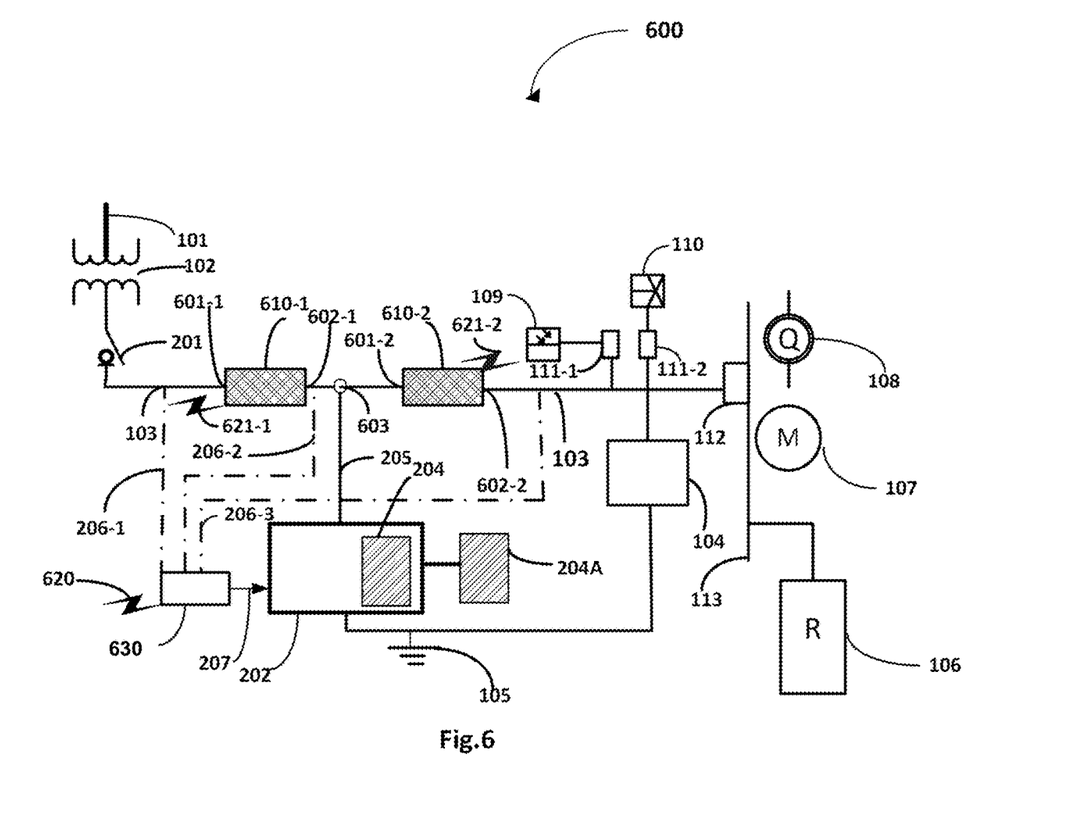
FIG. 6 is an example schematic diagram of a distribution grid system having two active filters attached on either side of a FACTS based full-bridge shunt inverter system to enable impedance adjustment for power flow control within an associated distribution grid according to an embodiment.

FIG. 6 is an example schematic diagram of a distribution grid system having two active filters to control the power flow into, out of and within the distribution grid. Referring to FIG. 6, distribution grid system 600 includes active filter 610-1 attached or connected at active filter terminals 601-1 and 602-1 and active filter 610-2 attached or connected at active filter terminals 601-2 and 602-2 to the distribution grid 103 on either side of a FACTS based full-bridge shunt inverter system 202 connecting at node or terminal 603 to the distribution grid 103, to enable impedance adjustment for power flow control within the distribution grid 103. The distribution grid 103 has coupled distributed natural resource based renewable generators, such as the generator 109 (e.g., a wind generator) and generator 110 (e.g., a solar generator). The distributed natural resource based renewable generators may be coupled to the distribution grid 103 through FACTS controllers 111-1 and 111-2. The distribution grid 103 is also coupled to the various loads 106, 107 and 108 shown coupled through a load bus 113 that is connected to the distribution grid 103 through the demand-response capable FACTS controller 112. FIG. 6 also shows an enhanced storage battery 204A which is used to enable storage of any excess power generated by the natural resource based renewable generators 109,110 under optimum conditions. This stored power is usable for the loads 106-108 when the natural resource based renewable generators are not operational, by using only the power stored in the enhanced storage battery 204A, the required power from battery source 204 for grid formation and supply to sustain the distribution grid when the connect-disconnect switch 201 disconnects the distribution grid 103 from the transmission grid 101 is retained under all normal operating conditions.

The controller 630 is an enhanced controller, which may include the functionalities of controller 203 of FIG. 2, that is able to sense the condition of the distribution grid 103 via sense lines 206-1 to 3 from sensors attached to the distribution grid 103. Also, the controller 630 and the active filters may be communicably coupled to each other over wireless links or infrared links. The communication capability between the controller 630 and the filters may also be established over optical channels. Wireless communication link 620 shown also enables the controller 630 to connect to and communicate with a system utility (not shown) for transfer of information and to receive control instructions when necessary. The communication capability established are shown as communication links 620 and 621-1 and 621-2.

Figure 7A:
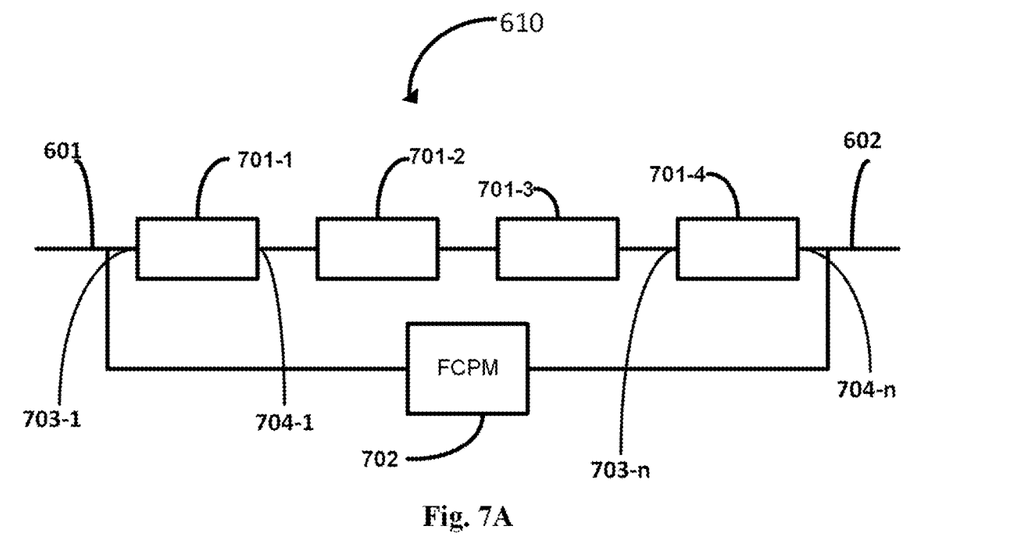
FIG. 7A is a schematic diagram of example series connected blocks forming an active filter connected in series on the distribution grid and having a fault current protection module (FCPM) in parallel to provide any needed protection to electronic circuits of the blocks according to an embodiment.

FIG. 7A is a schematic diagram of example series connected blocks forming an active filter. As shown in FIG. 7A, blocks 701-1 to 701-4 are connected in series to form an active filter 610 (which may be active filter 610-1 or 610-2 of FIG. 6). Active filter 610 may be connected in series on the distribution grid 103, through active filter terminals 601-602, to allow synchronized injection of impedance as a pseudo sinusoidal waveform to be smoothed to a sinusoidal waveform on the distribution grid 130. Active filter 610 may also include a fault current protection module (FCPM) 702 connected in parallel with blocks 701-1 to 701-4 to provide any needed fault current protection to the electronic circuits of the blocks 701-1 to 701-4 in the active filter 610.

Figure 7B:
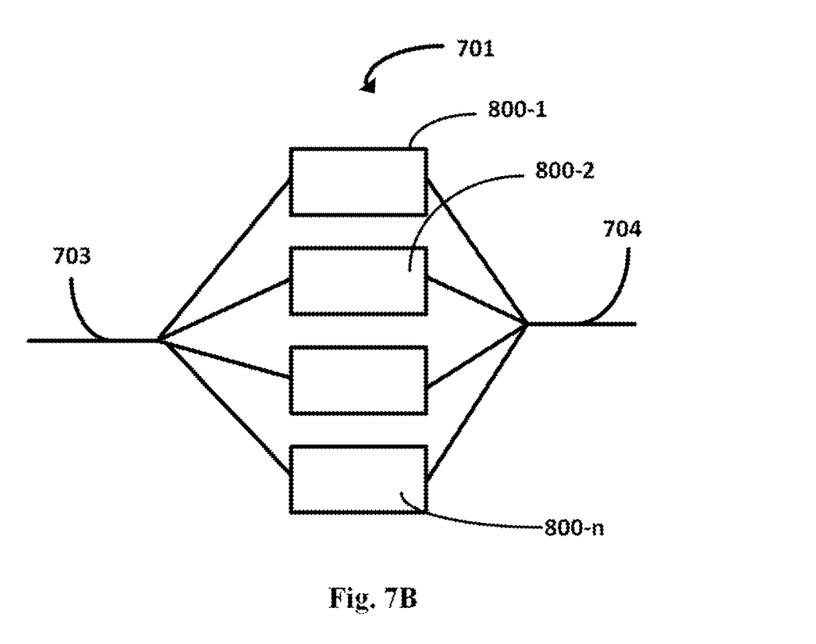
FIG. 7B is a schematic diagram of an example plurality of parallel connected FACTS based full bridge impedance injection units (IIUs) forming the series connected blocks of the active filter according to an embodiment.

FIG. 7B is a schematic diagram of example parallel connected FACTS-based full bridge impedance injection units (IIUs) 800-1 to 800-n forming a block (which may be any of blocks 701-1 to 701-4) of the active filter 610. The number of parallel connected IIUs 800-1 to 800-n are based on a total peak current carrying capability of the distribution grid (e.g., distribution grid 103).

Figure 8:
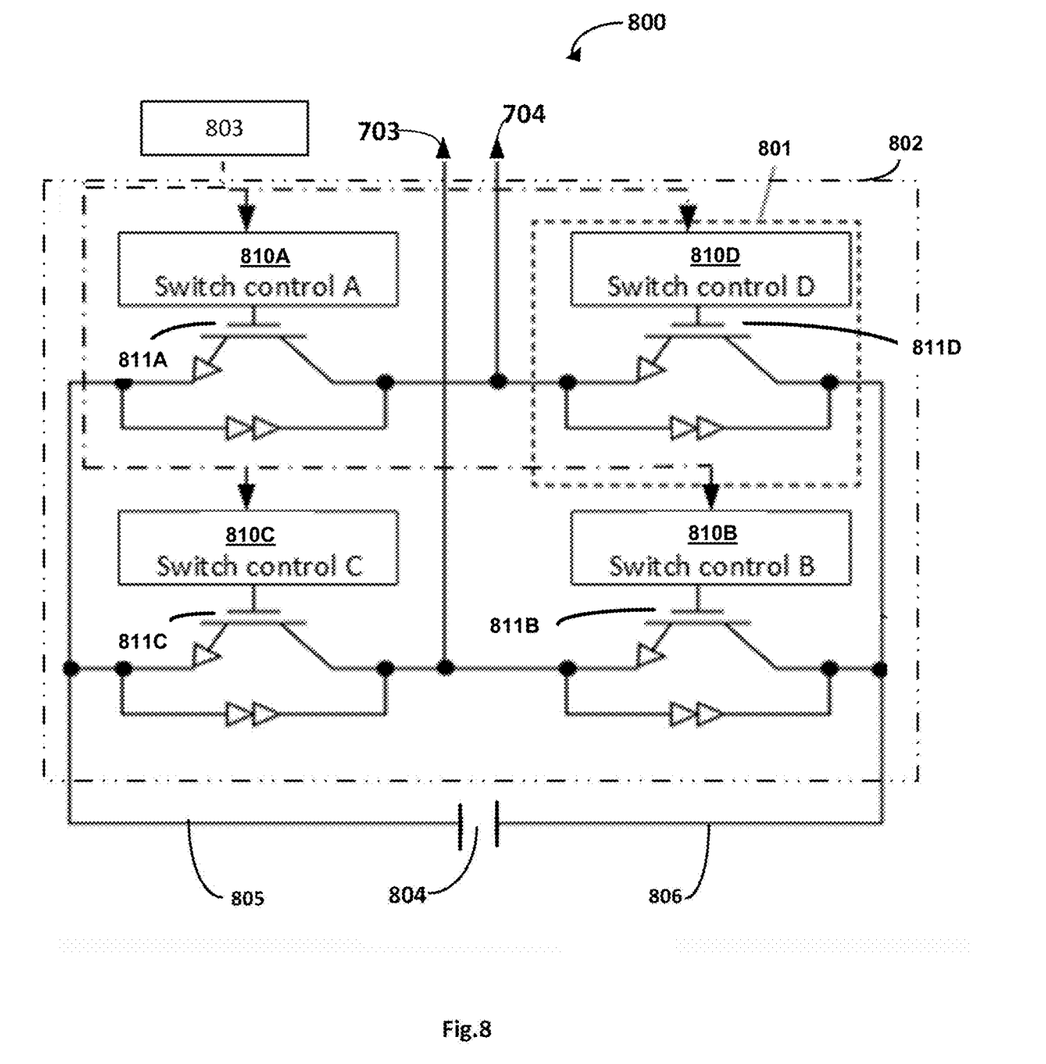
FIG. 8 is a schematic diagram of an example full bridge IIU showing the FACTS based components and control capability provided for impedance injection for controlling the power flow according to an embodiment.

FIG. 8 is a schematic diagram of an example full bridge IIU showing the FACTS based components and control capability provided for impedance injection for controlling the power flow. As shown, IIU 800 (which may be any of IIUs 800-1 to 800-n of FIG. 7B) may include, but not limited to, four FACTS-based switches 801 connected (e.g., in series-parallel connections) to form a full bridge inverter 802. IIU 800 may be connected to a distribution grid (e.g., distribution grid 103 of FIG. 2) at IIU terminals 703 and 704, thereby connecting IIU 800 in series with the distribution grid. Each FACTS-based switch 801 may include a switch control circuit (e.g., any of switch control circuits 810A-D) and an IGBT (e.g., any of IGBTs 811A-D), with the switch control circuit connecting to a respective IGBT. As shown, IIU terminal 703 may be connected to a bridge between IGBTs 811B and 811C, and IIU terminal 704 may be connected to a bridge between IGBTs 811A and 811D. In an embodiment, the switch control circuits 810A-D are under control of a master controller 803 to control or operate (e.g., adjusting switch initiation and timing) the respective IGBTs 811A-D. A capacitor 804 connected across the switch terminals 805 and 806 of the full bridge inverter 802. By adjusting the switch on off cycle it is possible to generate inductive or capacitive impedance to be injected into the distribution grid at the connected locations. This impedance injection can increase or decrease the impedance and control the current flow over the sections of the distribution grid 103 with coupled active filters 610. In an embodiment, master controller 803 may be similar to or the same as controller 630 of FIG. 6. Master control 803 may generate impedance injection waveforms to be injected into a transmission line from series-connected IIUs. The IIUs may be operated by extracting power from the transmission line to which they are connected in series.

Operation of the Flow Control:

The two active filters 610-1 and 610-2 connected in series on the line on either side of the connection point of the FACTS based full bridge shunt inverter 202 to the distribution grid enable the utility to exert full control of the power transfer to and from and usage within the distribution grid 103 as described herein. The active filters are able to change, for example add impedance to transmission lines at the points where they are coupled to control the power flow. There are four impedance combinations possible with the two active filters. Although the impedances are shown to vary between a minimum and maximum in the examples it should be understood that other intermediate conditions can be established by the utility to achieve needed unique functionality for the distribution system. The four example conditions/settings discussed are shown in table 1 below:

TABLE 1

| Active filter | Filter State 1 | Filter State 2 | Filter State 3 | Filter State 4 |
|---|---|---|---|---|
| 610-1 | Low | High | Low | High |
| 610-2 | Low | Low | High | High |

Enabling these four filter states, the utility is able to control where the power is drawn from for the loads. The utility is also able to use the impedance injection modules used as active filters connected in series with the lines to balance the power flow.

Filter state 1: In filter state 1 condition, both the filters are kept at low impedance and does not exert any control on the power transfer. In this condition under normal operation any power flow is enabled and controlled from the transmission grid 101 into the distribution grid 103. If the natural resource-based generation capability is operational that power is share between the various power consuming and storage capabilities in addition to flowing back into the transmission grid 101 from the distribution grid. Under this condition there is no flow control exerted by the series connected active filters 610-1 and 610-2, that are for example transformer-less impedance injection modules (TL-IIms) used for power flow control on the power grid, which are at the low impedance condition. The total power flow within the distribution grid 103 is the shared power transfer due to the power from or to the transmission grid, the power required to charge up the batteries 204 and 204A of the FACTS based full bridge shunt inverter 202, the power output from the natural resource based renewable energy generators 109, 110 and the power demand from the loads 106, 107, 108 coupled to the load bus 111. In this case the active filters exert no control on the power flow conditions of the distribution grid 103.

Filter state 2: In filter state 2 condition filter 610-1 is at high impedance and the filter 610-2 is at low impedance. The power flow from the transmission line into the distribution grid or from the distribution grid to the transmission grid is reduced and controlled. The low impedance of the active filter 610-2 enables transfer of power from the natural resource based renewable energy generators 109, 110, to be shared between the batteries 204 and 204A for charging them and the coupled loads 106, 107, 108 coupled to the load bus 111 if the generation capacity is lower than the load demand then the stored energy from the auxiliary battery 204A is drawn to satisfy the demand of the loads. This state of the distribution grid optimizes the capability established on the distribution grid to maximize the use of the natural resource based renewable energy generators 109, 110 and the auxiliary storage capability provided by the Battery 204A to reduce the carbon footprint by reducing the power input from the transmission grid 101. Limiting the power flow to and from the transmission grid 101 can result in reducing the injected harmonics.

Filter state 3: The condition of the filter 610-1 is low and the condition of the filter 610-2 is high. This state allows the battery system to be replenished and charged from the power drawn from the transmission grid 101 via the low impedance of Filter 610-1, while the high impedance of introduced by the filter 610-2 limits the power flow to the batteries from the power generated by the natural resource based renewable energy generators 109, 110. Hence the power generated by the natural resource based renewable energy generators 109, 110 is only available to be used by the loads 106, 107 and 108. This setting is optimized for a condition when the power from the natural resource based renewable energy generators 109, 110, is sufficient to only meet the demand of the load. While the batteries 204 and 204A are depleted and need power to recharge, which will be drawn from the transmission grid 101.

Filter status 4: In this state both the filters 610-1 and 610-2 are set to provide high impedance paths. Here the load demand would be fully met by only the power generated by the natural resource based renewable energy generators 109, 110. The full bridge shunt inverter system 202 with connected batteries 204 and 204A is isolated from the transmission side and also the distribution side with the natural resource based renewable energy generators 109, 110. The condition of the batteries is assumed to be fully charged with no requirement for further power.

It should be understood that though the four example states of the filters are discussed the utility is able to set impedance values to intermediate conditions to allow partial power flow through the filters based on the conditions identified by the sensor lines 206-1, 206-2 and 206-3 and the battery 204 and 204A status as communicated to the utility.

Such a system is hence able to allow the utility to control and optimize the distribution grid power flow to best meet any set objectives of the utility.

It should be further noted that even though the control capability is shown with two active filters, in some embodiments where cost is the major criteria a single active filter may be used to achieve partial control of the distribution grid. Use of a single filter should not be considered an improvement over the use of two active filter embodiment described herein.

In various embodiments, some of the advantages of this control system described above are summarized below:

1. Provides utility full flexibility to control power flow to and from and within the distribution grid.
2. Enable utility to optimize power usage from the natural resource based renewable energy generators 109, 110 to reduce power drain from the transmission grid.
3. Use of power generated from the natural resource based renewable energy generators 109, 110 result in lower carbon footprint.
4. Reduced power flow from transmission grid reduces harmonics injected into power available to loads.
5. Storage of excess power generated by the natural resource based renewable energy generators and reuse of the stored power during low generation periods allow the power optimization within the power grid.
6. The power storage capability established and the impedance control within the distribution grid can be used for time of use-based pricing of power.

While the disclosure has been described in terms of several embodiments, those of ordinary skill in the art will recognize that the disclosure is not limited to the embodiments described but can be practiced with modification and alteration within the spirit and scope of the appended claims. Advances in technology will also provide for additional ways to practice the embodiments described herein. These are anticipated and covered by the current application. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for controlling power delivery and power flow in a distribution grid having grid forming capability, the system comprising:

a connect-disconnect switch operable to connect a power transmission grid to and disconnect the power transmission grid from the distribution grid, the distribution grid having renewable energy generators and a plurality of loads;

a full bridge shunt inverter system connected to the distribution grid, the full bridge shunt inverter system comprising a four-quadrant DC-to-AC inverter and at least a battery for power storage and operable as a power source for grid formation; and a pair of active filters connected in series on the distribution grid;

wherein the active filters are operable in at least four filter states; and wherein the full bridge shunt inverter system is connected to the distribution grid at a node between the active filters to enable impedance adjustment for power flow control of the distribution grid.

2. The system of claim 1 wherein the active filters are operable by a utility to control impedance of transmission lines at the node.

3. The system of claim 1 wherein the at least four filter states include:
a first filter state in which the active filters are operable to exert no control on power flow conditions of the distribution grid;
a second filter state in which the active filters are operable to reduce power flow from the power transmission grid to the distribution grid, or from the distribution grid to the power transmission grid;
a third filter state in which the active filters are operable to enable the battery to charge using power drawn from the power transmission grid, and to provide power drawn from the renewable energy generators to the loads; and
a fourth filter state in which the active filters are operable to isolate the full bridge shunt inverter system from the power transmission grid, and to provide the power drawn from the renewable energy generators to the loads.

4. The system of claim 1 further comprising a controller to:
operate the connect-disconnect switch to connect the power transmission grid to and disconnect the power transmission grid from the distribution grid,
continuously sense voltages and currents on the distribution grid, and
(i) operate the full bridge shunt inverter system to generate and inject impedance into the distribution grid at the node to provide power factor correction at the plurality of loads, or (ii) provide switching instructions to the four-quadrant DC-to-AC inverter to enable grid formation and sustain continued operation of the distribution grid.

5. The system of claim 4 wherein the controller and the active filters are communicatively coupled to each other and to a utility via a plurality of communication links.

6. The system of claim 1 wherein each active filter includes a plurality of full bridge impedance injection units (IIUs) connected in a series-parallel connection.

7. The system of claim 6 wherein each active filter further includes a fault current protection module connected in parallel with the full bridge IIUs, to provide fault current protection to the full bridge IIUs.

8. The system of claim 6 wherein each IIU includes a plurality of flexible alternating current transmission system (FACTS) based switches.

9. The system of claim 8 wherein each FACTS-based switch includes a switch control circuit and an insulated gate bipolar transistor (IGBT), the switch control circuit being controlled by a master controller to adjust switch initiation and timing of the IGBT.

10. The system of claim 6 wherein each IIU includes a capacitor and switch terminals, the capacitor being connected across the switch terminals.

11. A method of controlling power flow between a power transmission grid and a distribution grid having grid forming capability, the distribution grid being connected in series with a pair of active filters, the method comprising:
in a first filter state, operating the active filters to exert no control on power flow conditions of the distribution grid;
in a second filter state, operating the active filters to reduce power flow from the power transmission grid to the distribution grid, or from the distribution grid to the power transmission grid;
in a third filter state, operating the active filters to enable at least one battery of a full bridge shunt inverter system to charge using power drawn from the power transmission grid, and to provide power drawn from renewable energy generators of the distribution grid to a plurality of loads of the distribution grid; and
in a fourth filter state, operating the active filters to isolate the full bridge shunt inverter system from the power transmission grid, and to provide the power drawn from the renewable energy generators to the loads.

12. The method of claim 11 wherein
the full bridge shunt inverter system comprises a four-quadrant DC-to-AC inverter and the at least one battery for power storage and operable as a power source for grid formation;
the full bridge shunt inverter system is connected to the distribution grid at a node between the active filters to enable impedance adjustment for power flow control of the distribution grid.

13. The method of claim 12 further comprising:
operating, through a controller, a connect-disconnect switch to connect the power transmission grid to and disconnect the power transmission grid from the distribution grid;
continuously sensing, through the controller, voltages and currents on the distribution grid; and
(i) operating, through the controller, the full bridge shunt inverter system to generate and inject impedance into the distribution grid at the node to provide power factor correction at the plurality of loads, or (ii) providing, through the controller, switching instructions to the four-quadrant DC-to-AC inverter to enable grid formation and sustain continued operation of the distribution grid.

14. The method of claim 13 wherein the active filters and the controller are communicatively coupled to each other, and to a utility that operates the active filters and the controller via a plurality of communication links.

15. The method of claim 11 wherein each active filter includes a plurality of full bridge impedance injection units (IIUs) connected in a series-parallel connection.

16. The method of claim 15 wherein each active filter further includes a fault current protection module connected in parallel with the full bridge IIUs, to provide fault current protection to the full bridge IIUs.

17. The method of claim 15 wherein each IIU includes a plurality of flexible alternating current transmission system (FACTS) based switches.

18. The method of claim 17 wherein each FACTS-based switch includes a switch control circuit and an insulated gate bipolar transistor (IGBT), the switch control circuit being controlled by a master controller to adjust switch initiation and timing of the IGBT.

19. The method of claim 15 wherein each IIU includes a capacitor and switch terminals, the capacitor being connected across the switch terminals.

20. The method of claim 11 wherein the renewable energy generators are connected to the distribution grid through a plurality of flexible alternating current transmission system (FACTS) based controllers.

* * * * *